(12) United States Patent
Lee et al.

(10) Patent No.: US 8,051,966 B2
(45) Date of Patent: Nov. 8, 2011

(54) OVERRUNNING BI-DIRECTIONAL CLUTCH ASSEMBLY

(75) Inventors: Brian Lee, York, SC (US); Christopher Bartus, Charlotte, NC (US)

(73) Assignee: Schaeffler KG, Herzogenaurach (DE)

( * ) Notice: Subject to any disclaimer, the term of this patent is extended or adjusted under 35 U.S.C. 154(b) by 1048 days.

(21) Appl. No.: 11/923,915

(22) Filed: Oct. 25, 2007

(65) Prior Publication Data
US 2008/0099299 A1 May 1, 2008

Related U.S. Application Data

(60) Provisional application No. 60/854,528, filed on Oct. 26, 2006, provisional application No. 60/876,651, filed on Dec. 22, 2006.

(51) Int. Cl.
*F16D 41/064* (2006.01)

(52) U.S. Cl. ............................ 192/38; 192/47; 192/93 C
(58) Field of Classification Search .................... 192/38, 192/37, 78, 45.1
See application file for complete search history.

(56) References Cited

U.S. PATENT DOCUMENTS

| 4,987,790 A * | 1/1991 | Weismann ..................... 74/333 |
| 6,557,680 B2 * | 5/2003 | Williams ......................... 192/27 |

* cited by examiner

*Primary Examiner* — David D Le
*Assistant Examiner* — Ryan Dodd
(74) *Attorney, Agent, or Firm* — Lucas & Mercanti, LLP

(57) ABSTRACT

The overrunning bi-directional clutch assembly has two coaxial slipper rings and use one actuator to simultaneously uncouple the slipper rings and lock the clutch. Also, the actuator uses a pair of cam surfaces, and corresponding cam following surfaces to actively control freewheel and lock mode of the clutch. A tab cutout arrangement indexes the two slipper rings.

10 Claims, 7 Drawing Sheets

OVERRUNNING BI-DIRECTIONAL CLUTCH ASSEMBLY

FIELD OF THE INVENTION

This invention relates to clutches and, more particularly, to an overrunning bi-directional clutch assembly having adjacent overrunning bi-directional clutches and an actuator assembly used for simultaneously effecting freewheel mode and lock mode of both clutches.

BACKGROUND OF THE INVENTION

Overrunning bi-directional clutches are known, see for example U.S. Pat. Nos. 6,409,001; 7,004,875; and 7,037,200. Such clutches are mounted between two coaxial shafts and are used to transfer power between the two shafts. The clutch is fixed to a first shaft and selectively engages the second shaft so as to transfer power between the two shafts. Typically, the first shaft is the power input shaft and typically, the first shaft is the inner shaft. The output shaft or second shaft can be a geared wheel.

Overrunning bi-directional clutches comprise a fixed ring, a slipper ring, cylindrical rollers which are housed between the two rings and may have an actuator. The fixed ring and the slipper ring are coaxial cylindrical rings with opposing faces. Each of the opposing faces has concave bearing surfaces which define pockets. Each pocket houses a roller.

The slipper ring has an axial groove or slit that extends both radially and axially through the ring. The slit allows the slipper ring to move radially under force and the memory inherent in the material from which the slipper ring is made allows the ring to return to a rest position once the force is withdrawn. The fixed ring is mounted onto the first shaft while the slipper ring is spaced in close proximity to the second shafts such that when the slipper ring moves radially, it engages the second shaft, thereby transferring power between the two shafts. Once the force is removed from the slipper ring, it returns to its rest position and no longer engages the second shaft.

The actuator is used to maintain the clutch in the freewheel mode and to move the clutch to the lock mode. Typically, the actuator has a radially moveable pin which is mounted to the fixed ring and retractable from the slipper ring. When the actuator pin engages both rings the two rings are coupled and the clutch is in the freewheel mode. In the freewheel mode, the opposing concave bearing surfaces are aligned with each other and the rollers rest in the bottom of each of the opposing concave surfaces. When the actuator pin is withdrawn from the slipper ring, the two rings move relative to one another and the rollers move out of the bottom of the opposing concave surfaces and rise up along diagonally opposing surfaces of the pocket so as to force the slipper ring to move radially and to engage the second shaft, thereby transferring power between the two shafts locking the clutch and placing the clutch in lock mode.

One of the limitations of overrunning bi-direction clutches is the amount of torque that can be transferred between the two shafts. Conventionally, in order to increase the amount of torque that the clutch can handle, the diameter of the rings is increased. The problem with increasing the diameter of the ring is that the volume needed for handling such clutches also increases. In certain applications, increase of diameter of the ring is not an option.

Another problem associated with overrunning bi-directional clutches is the vitality of the spring used to effect the lock mode of the clutch. The actuator has a spring which withdraws the actuator pin from the slipper ring to uncouple the two rings and effect the lock mode. The actuator also has a cam to move the actuator pin back into engagement of the slipper ring so as to couple the two rings and effect the freewheel mode. The spring can become worn and does not provide for direct control of the movement to lock mode.

OBJECT OF THE INVENTION

It is the object of the invention to provide an overrunning bi-directional clutch which can handle increased torque without increasing the diameter of the rings. It is also the object of the present Invention to provide a positive control for the movement to lock mode.

These and other objects will be more readily apparent by reference to the following description of the invention.

SUMMARY OF THE INVENTION

The present invention is able to handle increased torque by utilizing two axially adjacent slipper rings which are acted on simultaneously by a single actuator. In order to employ a single actuator for both slipper rings, the actuator catch for each of the slipper rings is located on axially adjacent inner edges of the slipper rings. This allows for a single actuator pin to work both actuator catches and to simultaneously engage and disengage both slipper rings. By simultaneously engaging and disengaging the slipper rings, the two slipper rings act as one slipper ring. The two slipper rings have increased axial surfaces for frictional engagement with the second shaft, thereby increasing the amount of torque that can be transferred between the two shafts.

Additionally, in order to index the two adjacent slipper rings, at least one tab and at least one cutout is positioned on the axially adjacent inner edges of the slipper rings. One tab is on the inner edge of one slipper ring and one cutout is on the inner edge of the other slipper ring. The tab and cutout couple with each other to index and maintain the two slipper rings in phase with each other.

In order to more positively control the disengagement of an actuator pin from the slipper rings, the actuator cam has two cam surfaces and the actuator pin has two corresponding cam following surfaces. One of the cam surfaces contacts one of the cam following surfaces in order to effect outward radial movement of the actuator pin and the other cam surface contacts the other cam following surface to effect inward radial movement of the actuator pin. By employing a cam surface and a cam following surface in order to effect both outward and inward radial movement of the actuator pin, positive control is maintained for the coupling (freewheel mode) and uncoupling (lock mode) of the slipper rings.

Broadly, the present invention is an overrunning bi-directional clutch assembly for transferring power between a first and second coaxial shaft, comprising:

(a) two axially adjacent cylindrical slipper rings of equal diameter, each of said slipper rings having a first radial surface for frictional engagement with the second shaft, a second radial surface having a bearing surface thereon, and an axial inner edge, the axial inner edge of one said slipper rings adjacent the axial inner edge of the other of said slipper rings;

(b) a cylindrical fixed bearing surface, affixed to said first shaft;

(c) said slipper rings coaxial with and radially opposing said fixed bearing surface such that said second radial surface of said slipper rings radially opposes said fixed bearing surface;

(d) at least one tab at the axial inner edge of one of said slipper rings;

(e) at least one cutout at the axial inner edge of the other of said slipper rings, said cutout couples with said tab to index said two slipper rings;

(f) two actuator catches, one at each inner edge of said slipper rings; and (g) an actuator assembly at said fixed bearing surface, said actuator assembly engageable with both said actuator catches to simultaneously couple and uncouple both said slipper rings from said fixed ring bearing surface.

The fixed bearing surface can be an outer surface of the first shaft, or an outer surface of one or more fixed cylindrical rings. In the case of a fixed cylindrical ring, the fixed cylindrical ring has a first radial surface affixable to the first shaft and a second radial surface which acts as the fixed bearing surface. The fixed cylindrical ring can be two fixed cylindrical rings which are axially adjacent, have equal diameters and radially oppose each of the two slipper rings. Preferably, the bearing surface is the outer surface of one fixed cylindrical ring.

Rollers are used to effect radial movement of the slipper ring. The rollers are cylindrical rollers, balls or sprags. When cylindrical rollers or balls are used to effect radial movement of the slipper rings, the bearing surfaces of the slipper rings and the fixed bearing surface each have a plurality of concave bearing surfaced thereon. Each of the plurality of concave bearing surfaces of the slipper rings radially oppose a corresponding concave bearing surface on the fixed bearing surface so as to form a plurality of pockets and the cylindrical rollers or balls, are housed in these pockets.

When sprags are used to effect radial movement of the slipper rings, a conventional cage for the sprags is used and the sprags in the cage are positioned between the bearing surfaces of the slipper rings and the fixed bearing surface. The bearing surfaces can be smooth to accommodate the movement of the sprags, however, pockets or a plurality of concave bearing surfaces can be used on one of the bearing surfaces.

The actuator assembly of the present invention comprises:
an actuator pin radially moveable, said actuator pin having a first end and a second end, said first end movably engageable with said actuator catches; and
an actuator cam axially moveable for engagement with said second end of said actuator pin for effecting both inward and outward radial movement of said actuator pin.

Suitably, the actuator cam has two cam surfaces and the second end of said actuator pin has two cam following surfaces. One of each of said cam surfaces contacts and acts on one of each of said cam following surfaces to effect radial movement of said actuator pin.

Suitably, one of the cam surfaces which contacts one of the cam following surfaces effects outward radial movement of the actuator pin while the other of the cam surfaces that contacts the other of the cam following surfaces effects inward radial movement of the actuator pin.

Preferably, the second end of the actuator pin has a knob and the top of the knob is attached to the end of the pin. The top of the knob provides the cam following surface for effecting inward radial movement of the actuator pin while the bottom of the knob acts as the cam following surface for effecting outward radial movement of the actuator pin.

Preferably, the actuator cam is a housing with a radially slanted, axially oriented bottom wall that acts on the cam following surface positioned at the bottom of the knob. The housing also has a radially slanted, axially oriented top wall with a U-shaped channel therein. The knob is positioned inside said housing such that the top of the knob is acted on by the top wall of the housing and the pin extends through the U-shaped channel.

Preferably, three tab cutout arrangements are employed for indexing the two slipper rings. To employ three tab cutout arrangements, the inner edge of one slipper ring preferably has one cutout and two tabs while the inner edge of the other slipper ring has two cutouts and one tab.

Preferably, the inner edges of each slipper ring has an inwardly, radial ledge in which the tab cutout arrangements are formed.

These and other aspects of the present invention will be more readily understood by reference to one or more of the following drawings.

DETAILED DESCRIPTION OF THE DRAWINGS

Figure 1:
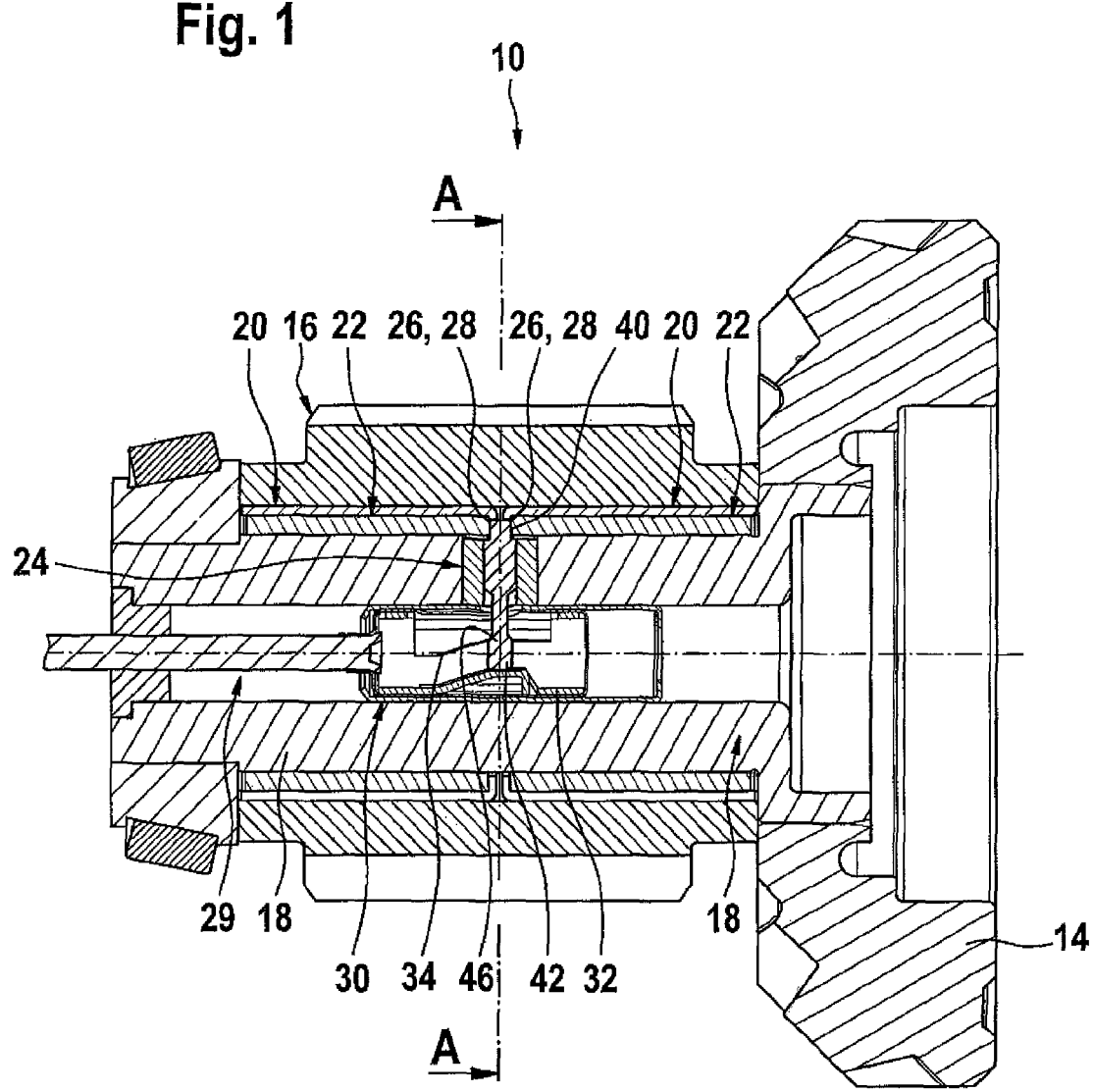
FIG. 1 is a cross sectional view of the overrunning bi-directional clutch assembly of the present invention.

FIG. 1 illustrates clutch assembly 10 positioned between output shaft 14 and input shaft 16. A fixed inner ring 18 is fixed to output shaft 14, two outer slipper rings 20 radially oppose fixed inner ring 18 and is spaced apart from input shaft 16. Cylindrical, rollers 22 are positioned between rings 18 and 20 and actuator assembly 24 is fitted inside shaft 14 and extends through ring 18. Actuator assembly 24 engages actuator catches 26 which are positioned on the axial inner edges 28 of each slipper ring 20. Inner ring 18 is illustrated as a single ring in FIG. 1.

Actuator assembly 24 has actuator shaft 29 which effects the axial movement of actuator housing 30. Actuator housing 30 has a bottom wall 32 and a top wall 34. Actuator housing 30 is axially oriented in clutch assembly 10. Actuator pin 36 has a top end 38 which mates with actuator catches 26 on both slipper rings 20 and extends through hole 40 of fixed ring 18. The bottom end of actuator pin 36 has knob 42 affixed thereto. Knob 42 has a bottom surface 44 that is acted on by bottom wall 32 to effect outwardly radial movement of actuator pin 36. Knob 42 has top surface 46 which is acted on by top wall 34 to effect inward radial movement of actuator pin 36.

Figure 2:
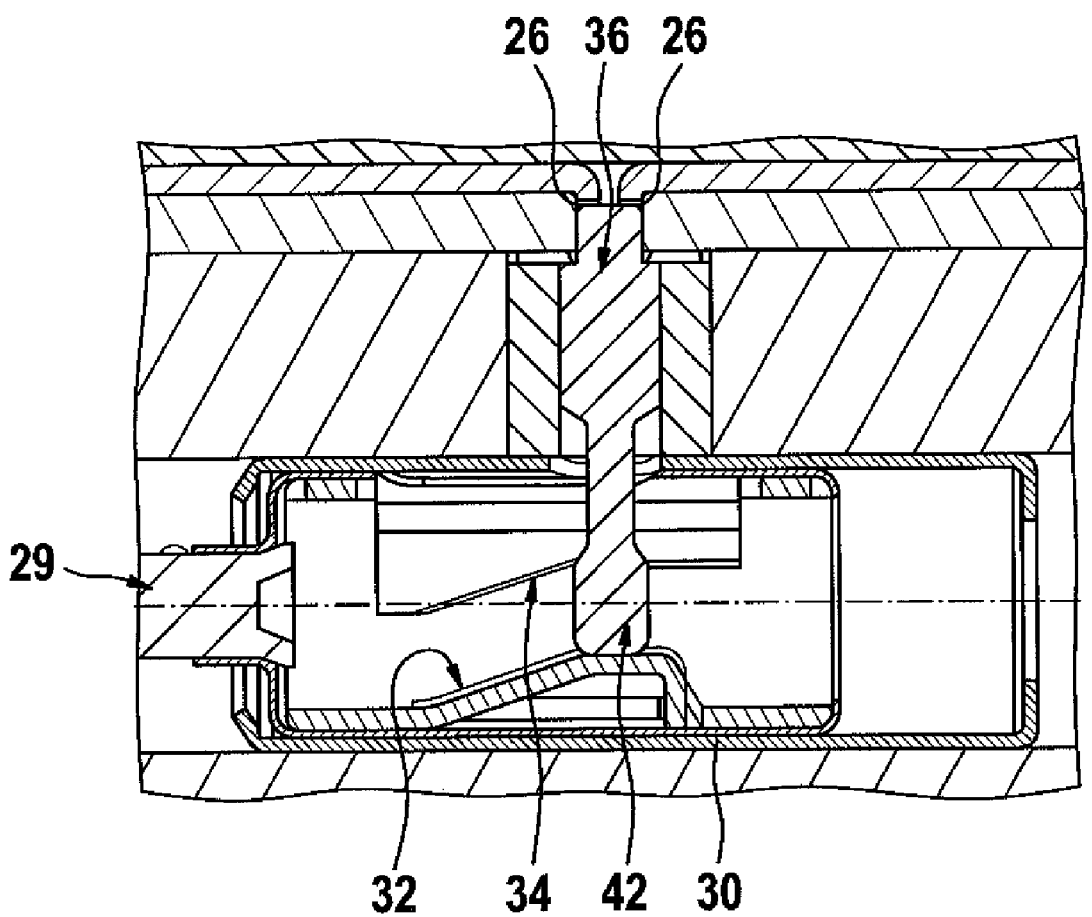
FIG. 2 is a close up illustration of the actuator assembly of the present invention in the coupled mode.
Figure 3:
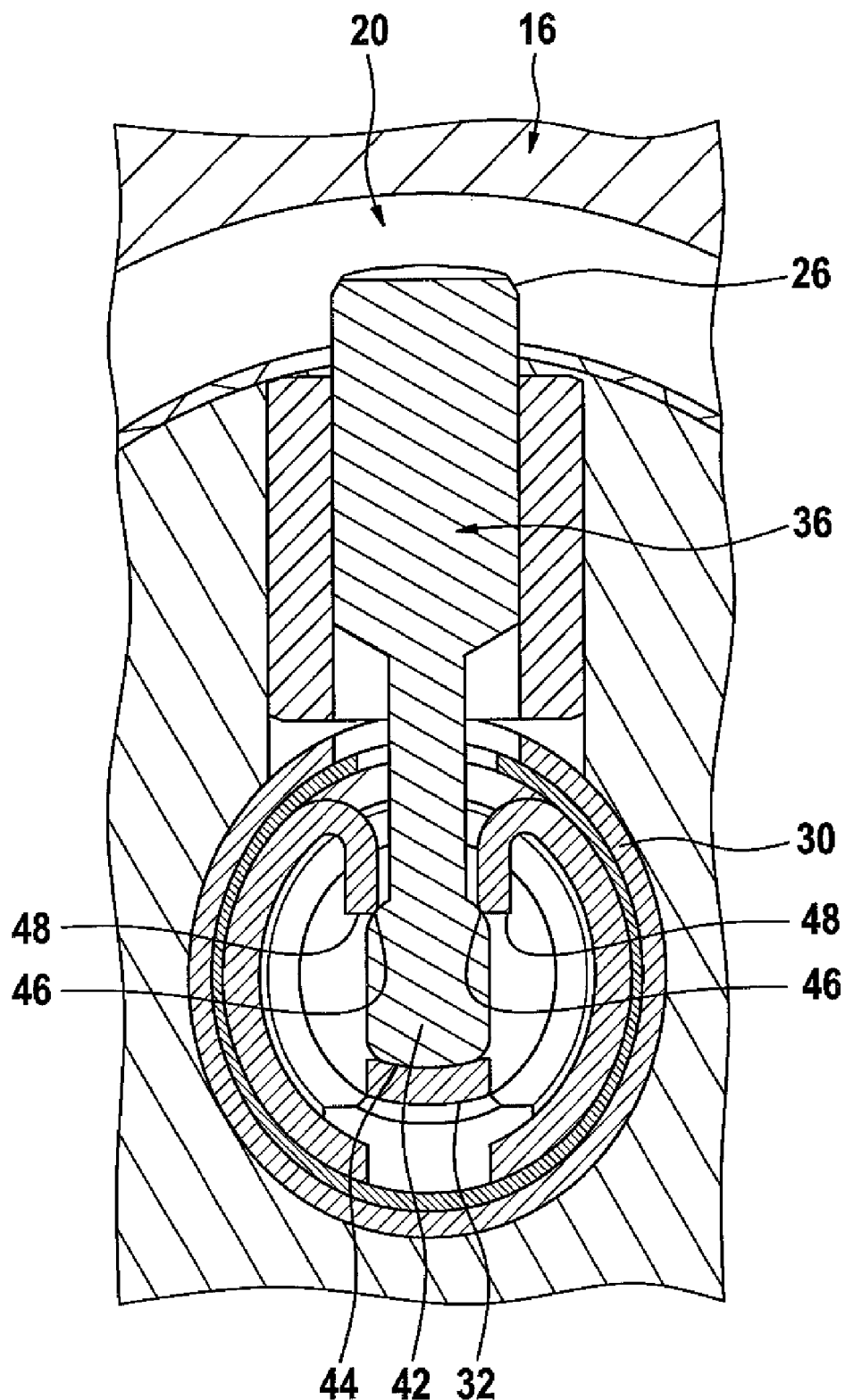
FIG. 3 is a close up cross sectional view of the actuator assembly of the present invention in the coupled mode taken along lines A A of FIG. 1.

FIGS. 2 and 3 provide a more detailed illustration of actuator assembly 24 in the freewheel mode. FIG. 2 is a longitudinal cross section of actuator assembly 24 while FIG. 3 is a cross section of actuator assembly taken along lines A A of FIG. 1. As seen in FIG. 3, top wall 34 of actuator housing 30 is bent inward to form two cam surfaces 48 which act on top surface 46 thereby causing top surface 46 to act as a cam following surface. Bottom wall 32 of housing 30 acts as a cam surface against bottom surface 44 of knob 42, thus, bottom surface 44 acts as a cam following surface.

Figure 4:
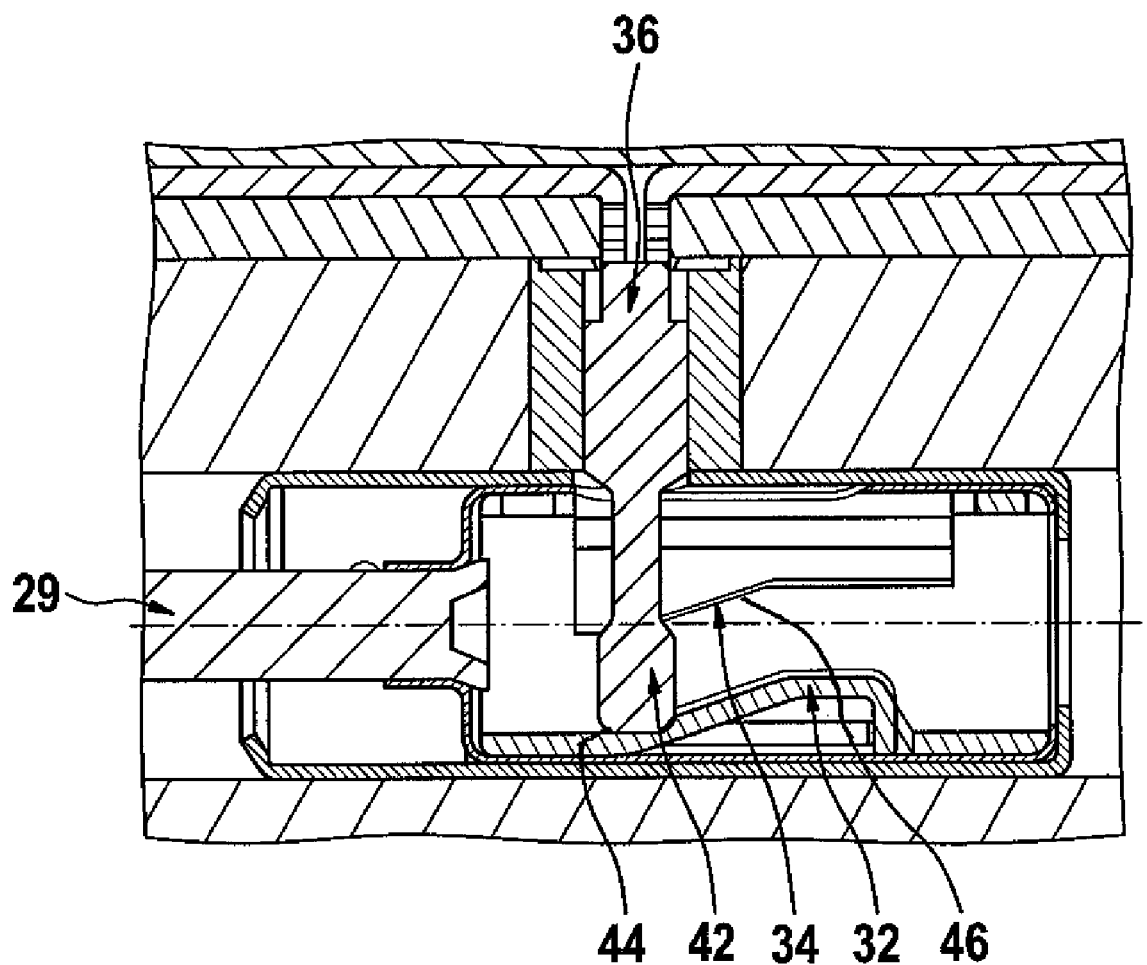
FIG. 4 is a close up of the actuator assembly of the present invention in the uncoupled mode.
Figure 5:
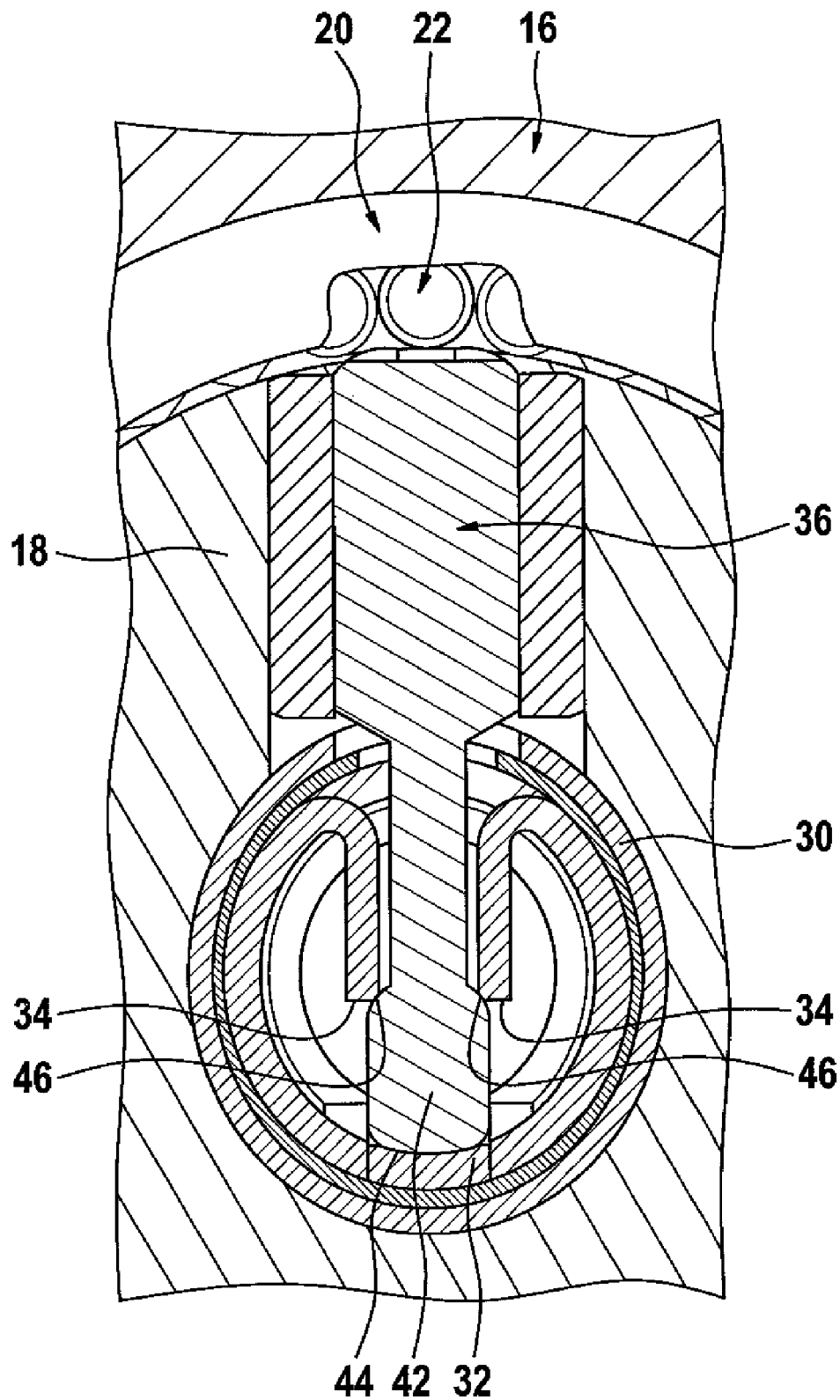
FIG. 5 is a close up of the actuator assembly of the present invention in the uncoupled mode taken along lines A A of FIG. 1.

Turning to FIGS. 4 and 5, FIG. 4 illustrates a longitudinal cross sectional view of actuator assembly 24 wherein actuator pin 36 has been withdrawn from actuator catches 26 thereby allowing slipper rings 20 to lag behind fixed ring 18 and for rollers 22 to move against diagonal surfaces of the concave bearing surfaces in each respective pocket. FIGS. 4 and 5 illustrate the movement of actuator pin 36 when it is uncoupled from slipper rings 20 and the lock mode of clutch assembly 10.

As evident by viewing FIGS. 2, 3, 4, and 5, actuator housing 30 with its bottom wall 32 and top wall 34, acts as cam surfaces against top surface 46 and bottom surface 44 of knob 42 in order to effect radial movement of pin 36 into and out of engagement with slipper rings 20.

Figure 6:
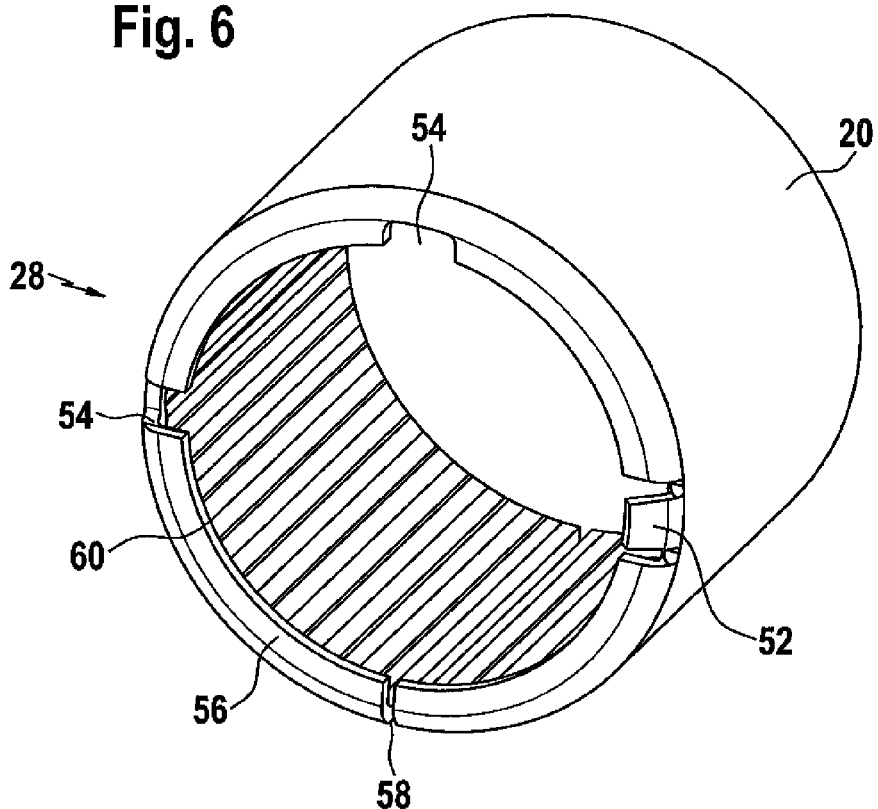
FIG. 6 illustrates the tab cutout arrangement of one slipper ring.
Figure 7:
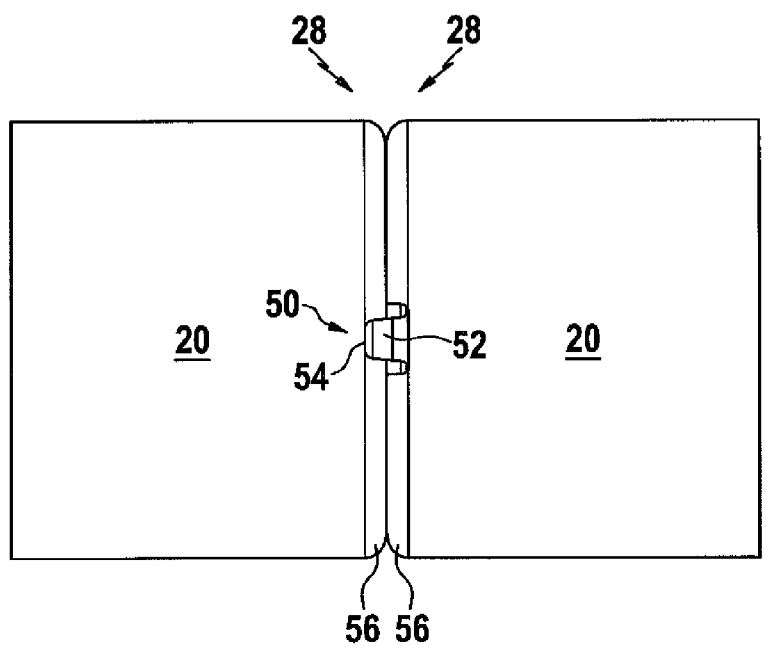
FIG. 7 illustrates the coupling of two slipper rings with the tab cutout arrangement.

FIGS. 6 and 7 illustrate tab cutout arrangement 50 comprising tab 52 and cutout 54 on inwardly, radial ledge 56 which is on axial inner edge 28 of slipper ring 20. FIG. 7 illustrates how tab 52 and cutout 54 couple to index the two slipper rings.

FIGS. 6 and 7 illustrate inwardly radial ledge 56 from which tab 52 and cutout 54 are formed. Slit 58 and concave bearing surfaces 60 of slipper ring 20 are illustrated in FIG. 6.

Figure 8:
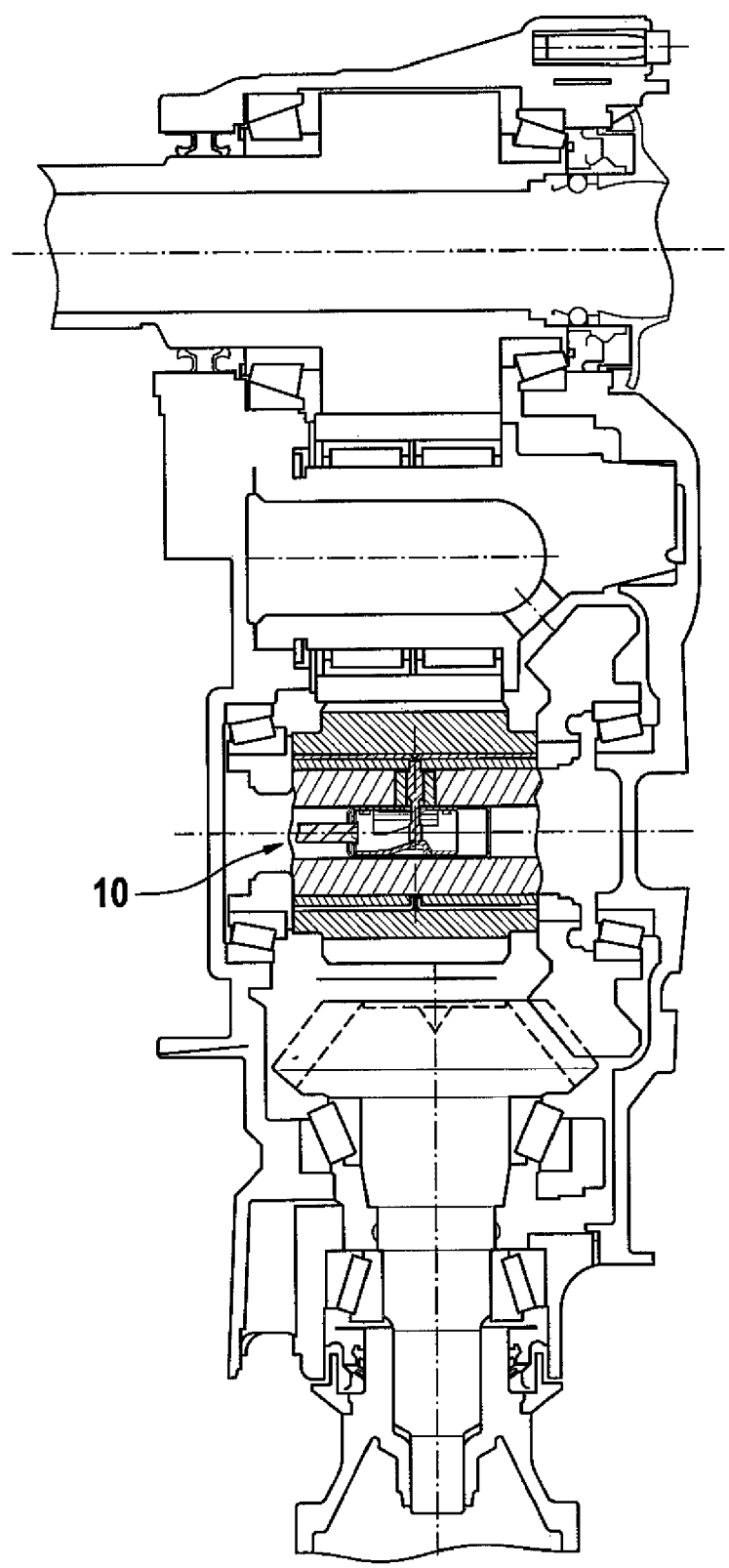
FIG. 8 illustrates the clutch assembly of the present invention between the transmission and the rear drive shaft of a front wheel drive vehicle.

FIG. 8 illustrates one of the uses of clutch assembly 10 of the present invention. In FIG. 8, a power transmission unit for a front wheel drive vehicle with all wheel drive or four wheel drive capability is illustrated. The power transfer unit provides a connection between the transmission and the rear drive shaft. Clutch assembly 10 allows for connection and disconnection of the power from the transmission to the rear axle. Clutch assembly 10 is located near the output gear shaft as can be seen in FIG. 8.

REFERENCE CHARACTERS 10 clutch assembly
14 output shaft
16 input shaft
18 fixed ring
20 slipper rings
22 rollers
24 actuator-assembly
26 actuator catches
28 axial inner edges
29 actuator shaft
30 actuator housing
32 bottom wall
34 top wall
36 actuator pin
38 top end
40 hole
42 knob
44 bottom surface
46 top surface
48 cam surfaces
50 tab cutout arrangement
52 tab
54 cutout
56 ledge
58 slit
60 concave bearing surfaces

What we claim is:

1. An overrunning bi-directional clutch assembly for transferring power between a first and a second coaxial shaft, comprising:

(a) two axially adjacent cylindrical slipper rings of equal diameter, each of said slipper rings having a first radial surface for frictional engagement with the second shaft, a second radial surface having a bearing surface thereon, and an axial inner edge, the axial inner edge of one of said slipper rings adjacent the axial inner edge of the other of said slipper rings;

(b) a cylindrical fixed bearing surface;

(c) said slipper rings coaxial with and radially opposing said fixed bearing surface such that said second radial surface of said slipper rings radially oppose the fixed bearing surface;

(d) at least one tab at the axial inner edge of one of said slipper rings;

(e) at least one cutout at the axial inner edge of the other of said slipper rings, said cutout couples with said tab to index said two slipper rings so that the two slipper rings operate as one slipper ring to provide an increased axial surface for frictional engagement with the second shaft, thereby increasing an amount of torque that is transferable between the first shaft and the second shaft;

(f) two actuator catches, one at each axial inner edge of said slipper rings;

(g) an actuator assembly at said fixed bearing surface, said actuator assembly engageable with both said actuator catches to simultaneously couple or uncouple both of said slipper rings from said fixed bearing surface.

2. The clutch assembly of claim 1, wherein said actuator assembly comprises:

an actuator pin radially moveable, said actuator pin having a first end and a second end, said first end movably engageable with both said actuator catches; and an actuator cam axially movable for engagement with said second end of said actuator pin for effecting both inward and outward movement of said actuator pin.

3. The clutch assembly of claim 2 wherein said actuator cam has two cam surfaces, and said second end of said actuator pin has two cam follower surfaces, and one of each of said cam surfaces contacts one of each of said cam follower surfaces to effect radial movement of said actuator pin.

4. The clutch assembly of claim 2 wherein said actuator cam has two cam surfaces, and said second end of said actuator pin has two cam follower surfaces, and one of said cam surfaces contacts one of said cam following surfaces to effect outward radial movement of said actuator pin and the other of said cam surfaces contacts the other of said cam following surfaces to effect inward radial movement of said actuator pin.

5. The clutch assembly of claim 4 wherein said second end of said actuator pin has a knob, a top of said knob affixed to said pin, said top of said knob having the other of said cam follower surfaces, and a bottom of said knob having the one of said cam follower surfaces.

6. The clutch assembly of claim 5 wherein said actuator cam has a housing with a radially slanted, axially oriented bottom wall that acts as said one cam surface and a radially slanted, axially oriented top wall with a U-shaped channel therein, said knob positioned in said housing and said actuator pin extending through said channel, said top wall acting as said other cam surface.

7. The clutch assembly of claim 1, further comprising:

a cylindrical fixed ring having a first radial surface affixable to a first shaft, a second radial surface which acts as said fixed bearing surface.

8. The clutch assembly of claim 1 wherein each of said slipper rings has an inwardly radial ledge on said axial inner edge, said tab formed from said ledge of said one slipper ring, said cutout formed from said ledge of said other slipper ring.

9. An actuator for an overrunning bi-directional clutch comprising:

- an actuator pin radially movable, said actuator pin having a first end, a central segment and a second end, said first end and said second end being connected by said central segment and said first end and said second end each having a width which is greater than that of said central segment, said first end being tapered so as to be movably engageable with actuator catches of a slipper ring; and
- an actuator cam axially movable for engagement with said second end of said actuator pin for effecting both inward and outward movement of said actuator pin,
- wherein said actuator cam has two cam surfaces, and said second end of said actuator pin has two cam follower surfaces, one of said cam surfaces contacts one of said cam follower surfaces to effect outward radial movement of said actuator pin and the other of said cam surfaces contacts the other of said cam follower surfaces to effect inward radial movement of said actuator pin,
- wherein said second end of said actuator pin has a knob, a top of said knob affixed to said pin, said top of said knob having the other of said cam follower surfaces, and a bottom of said knob having said one of said cam follower surfaces, and
- wherein said actuator cam has a housing with a radially slanted, axially oriented bottom wall that acts as said one cam surface and a radially slanted, axially oriented top wall with a U-shaped channel therein, said knob positioned in said housing and said actuator pin extending through said channel, said top wall acting as said other cam surface.

10. An overrunning bi-directional clutch assembly for transferring power between a first and a second coaxial shaft, comprising:

(a) two axially adjacent cylindrical slipper rings of equal diameter, each of said slipper rings having a first radial surface for frictional engagement with the second shaft, a second radial surface having a plurality of concave bearing surfaces thereon, and an axial inner edge, the axial inner edge of one of said slipper rings adjacent the axial inner edge of the other of said slipper rings;

(b) a cylindrical fixed ring having a first radial surface affixable to the first shaft, a second radial surface having a plurality of concave bearing surfaces thereon;

(c) said slipper rings coaxial with and radially opposing said fixed ring such that said second radial surface of said slipper rings radially oppose, the second radial surface of fixed ring and each of concave bearing surfaces of said slipper rings radially opposing a corresponding concave bearing surface of said fixed ring so as to form pockets there between;

(d) rollers in said pockets;

(e) at least one tab at the axial inner edge of one of said slipper rings;

(f) at least one cutout at the axial inner edge of the other of said slipper rings, said cutout couples with said tab to index said two slipper rings so that the two slipper rings operate as one slipper ring to provide an increased axial surface for frictional engagement with the second shaft, thereby increasing an amount of torque that is transferable between the first shaft and the second shaft;

(g) two actuator catches, one at each inner edge of said slipper rings;

(h) an actuator assembly affixed to said fixed ring and engageable with both said actuator catches to simultaneously couple and uncouple both of said slipper rings from said fixed ring.

* * * * *